United States Patent
Serbanescu et al.

(10) Patent No.: US 9,235,993 B2
(45) Date of Patent: Jan. 12, 2016

(54) METHOD OF CREATING MAP DATA COMPRISING TRANSIT TIMES FOR INTERSECTIONS

(75) Inventors: Alexandru Serbanescu, Amstelveen (NL); Volker Hiestermann, Laatzen (DE)

(73) Assignee: TomTom Global Content B.V., Amsterdam (NL)

( * ) Notice: Subject to any disclaimer, the term of this patent is extended or adjusted under 35 U.S.C. 154(b) by 0 days.

(21) Appl. No.: 12/736,941

(22) PCT Filed: Oct. 12, 2009

(86) PCT No.: PCT/EP2009/063261
§ 371 (c)(1),
(2), (4) Date: Jan. 10, 2011

(87) PCT Pub. No.: WO2010/063508
PCT Pub. Date: Jun. 10, 2010

(65) Prior Publication Data
US 2011/0112760 A1    May 12, 2011

Related U.S. Application Data

(60) Provisional application No. 61/193,485, filed on Dec. 3, 2008.

(30) Foreign Application Priority Data

Dec. 16, 2008 (GB) .................................. 0822893.4

(51) Int. Cl.
*G01C 21/26* (2006.01)
*G09B 29/10* (2006.01)
*G01C 21/32* (2006.01)

(52) U.S. Cl.
CPC .............. *G09B 29/106* (2013.01); *G01C 21/32* (2013.01)

(58) Field of Classification Search
CPC .............................. G09B 29/106; G01C 21/32

USPC ......... 701/200, 204, 208, 217, 218, 219, 201, 701/400, 408–410, 532–533
See application file for complete search history.

(56) References Cited

U.S. PATENT DOCUMENTS 5,731,978 A * 3/1998 Tamai et al. .................. 701/410
5,933,100 A * 8/1999 Golding .................. 340/995.13
(Continued)

FOREIGN PATENT DOCUMENTS

EP     2 136 345       12/2009
JP     2003228798 A    8/2003
(Continued)

OTHER PUBLICATIONS

International Search Report.

*Primary Examiner* — John Q Nguyen
*Assistant Examiner* — Michael Whalen

(57) ABSTRACT

A computerized method is disclosed of creating map data from position data derived from the positions of at least one vehicle over a period of time, the map data including a plurality of navigable segments representing segments of a navigable route in the area covered by the map and the map data also including intersections between navigable segments representing intersections in the navigable route. In at least one embodiment, the method includes using a processing circuitry to perform the following: i. processing the position data; ii. calculating from the processing of the position data a transit time or set of transit times for at least some of the intersections in the map data; and iii generating further map data, which for at least some of the intersections therein, contains the calculated transit time or set of transit times associated with the intersection for which the calculation was made.

12 Claims, 8 Drawing Sheets

(56) References Cited

U.S. PATENT DOCUMENTS

| | | | |
|---|---|---|---|
| 6,049,753 A * | 4/2000 | Nimura | 701/428 |
| 6,338,021 B1 * | 1/2002 | Yagyu et al. | 701/533 |
| 6,615,130 B2 * | 9/2003 | Myr | 701/117 |
| 7,133,768 B2 * | 11/2006 | Mukaiyama | 701/400 |
| 7,433,889 B1 | 10/2008 | Barton | |
| 2004/0030670 A1 | 2/2004 | Barton | |
| 2004/0215389 A1 * | 10/2004 | Hirose | 701/209 |
| 2005/0090976 A1 | 4/2005 | Beesley et al. | |
| 2005/0125143 A1 | 6/2005 | Beesley et al. | |
| 2005/0131641 A1 | 6/2005 | Beesley et al. | |
| 2010/0049428 A1 * | 2/2010 | Murata et al. | 701/118 |
| 2010/0250127 A1 * | 9/2010 | Hilbrandie et al. | 701/209 |
| 2010/0299055 A1 * | 11/2010 | Hilbrandie et al. | 701/200 |
| 2012/0095682 A1 * | 4/2012 | Wilson | 701/532 |
| 2012/0158301 A1 * | 6/2012 | Schilling et al. | 701/533 |

FOREIGN PATENT DOCUMENTS

| | | |
|---|---|---|
| JP | 2005259116 A | 9/2005 |
| JP | 2007-248183 | 9/2007 |
| WO | WO 2008/105403 | 9/2008 |

* cited by examiner

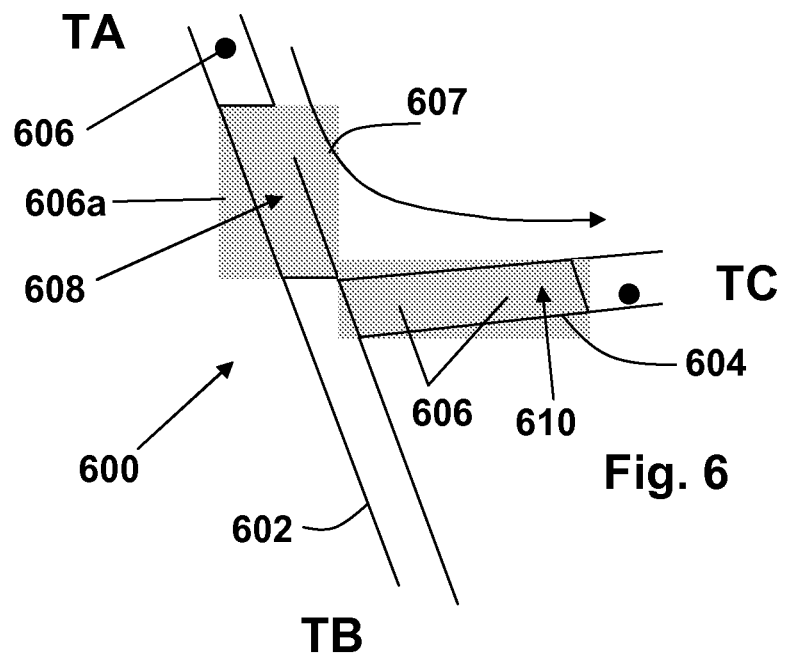
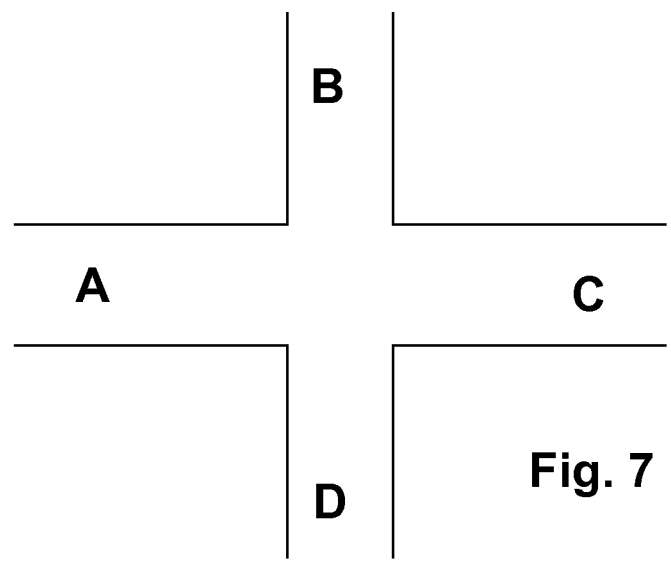

METHOD OF CREATING MAP DATA COMPRISING TRANSIT TIMES FOR INTERSECTIONS

This is a National Phase of PCT Patent Application No. PCT/EP2009/063261 filed on Oct. 12, 2009, which claims priority under 35 U.S.C. §365(c) and 119 to Great Britain Patent Application No. 0822893.4, filed on Dec. 16, 2008, and which claims priority under 35 U.S.C. §365(c) and 119(e) to U.S. Provisional Application No. 61/193,485, filed on Dec. 3, 2008, the contents of each of which are hereby incorporated herein by reference in their entirety.

FIELD OF THE INVENTION

The invention relates to a method of processing positioning data and in particular to processing positioning data in order to generate map data arranged to be used in navigation devices and in particular, but not especially in a Portable Navigation Device (PND). The invention also provides related apparatus for providing the method.

BACKGROUND TO THE INVENTION

Map data for electronic navigation devices, such as GPS based personal navigation devices like the GO™ from Tom-Tom International BV, comes from specialist map vendors such as Tele Atlas NV. Such devices are also referred to as Portable Navigation Devices (PND's). This map data is specially designed to be used by route guidance algorithms, typically using location data from the GPS system. For example, roads can be described as lines—i.e. vectors (e.g. start point, end point, direction for a road, with an entire road being made up of many hundreds of such segments, each uniquely defined by start point/end point direction parameters). A map is then a set of such road segments, data associated with each segment (speed limit; travel direction, etc.) plus points of interest (POI's), plus road names, plus other geographic features like park boundaries, river boundaries, etc., all of which are defined in terms of vectors. All map features (e.g. road segments, POI's etc.) are typically defined in a co-ordinate system that corresponds with or relates to the GPS co-ordinate system, enabling a device's position as determined through a GPS system to be located onto the relevant road shown in a map and for an optimal route to be planned to a destination.

To construct this map database, Tele Atlas utilises basic road information from various sources, such as the Ordnance Survey for roads in England. It also includes, but is not limited to, the deployment of a large, dedicated team of vehicles driving on roads, plus personnel checking other maps and aerial photographs, to update and check its data. This data constitutes the core of the Tele Atlas map database. This map database is being continuously enhanced with geo-referenced data. It is then checked and published multiple times a year to device manufacturers like TomTom.

Each such road segment has associated therewith speed data for that road segment which gives an indication of the speed at which a vehicle can travel along that segment and is an average speed generated by the party that produced the map data, which may be, for example, Tele Atlas. The speed data is used by route planning algorithms on PND's, or other devices, on which the map is processed. The accuracy of such route planning thus depends on the accuracy of the speed data. For example, a user is often presented with an option on his/her PND to have it generate the fastest route between the current location of the device and a destination. The route calculated by the PND may well not be the fastest route if the speed data is inaccurate.

It is known that parameters such as density of traffic can significantly effect the speed profile of a segment of road and such speed profile variations mean that the quickest route between two points may not remain the same. Inaccuracies in the speed parameter of a road segment can also lead to inaccurate Estimated Times of Arrival (ETA) as well as selection of a sub-optimal quickest route.

The map data also contains a time allowance for intersections between road segments. These time allowances tend to be fixed values for a given category of road segment on which they occur. Routing algorithms are arranged to use this time allowance when they are processing the map data to determine a route.

Tele Atlas has developed a system in which GPS data is uploaded from PND's and used to provide speed parameters for segments of the map data which aims to provide speed parameters which show the averaged true speed on a road segment at predetermined times of a day.

SUMMARY OF THE INVENTION

According to a first aspect of the invention there is provided a computerised method of creating map data from position data derived from the positions of at least one vehicle over a period of time, the map data comprising a plurality of navigable segments representing segments of a navigable route in the area covered by the map and the map data also comprising intersections between navigable segments representing intersections in the navigable route, the method comprising using a processing circuitry to perform the following steps:
  i. processing the position data;
  ii. calculating from the processing of the position data a transit time or set of transit times for at least some of the intersections in the map data; and
  iii. generating further map data, which for at least some of the intersections therein, contains the calculated transit time or set of transit times associated with the intersection for which the calculation was made.

Determining the transit time for an intersection from position data allows more specific transit times to be allocated for an intersection. Transit time through an intersection is a more complex property of the road network when compared to a transit time of a road segment; it is not an attribute of a given road segment, but a property of a driving maneuver across multiple road segments. Such "costs" can be considerable under certain circumstances, a prime example of which is the waiting time for a vehicle that wants to enter, or cross, a heavy-traffic road (e.g., during rush hours) that has right-of-way. Thus, increasing the accuracy of the transit time allows more accurate routes to be planned by devices using the map data.

The skilled person will appreciate that for any map that represents a navigable route by segments there will be a need to have boundaries between those segments; ie any route planned using that map will need to mover across a plurality of segments unless the route is short. It is convenient if those boundaries are provided at intersections in the navigable route but this need not be the case. However, embodiments of the invention may be utilised to determine a transit time or set of transit times for a transition between segments however those segments are arranged. That is the transit time between segments may not be derivable from the average speed, or speed profile, for segments over which the transition is occurring.

The method may analyse the position data in order to identify trips of vehicles within the position data.

The method may be arranged to determine routes through the intersection and to analyse the position data, and generally the trips identified within the position data, to determine trips that pass through the determined routes through the intersection. As discussed above different routes through any one intersection can have significantly different transit times; for example a left hand turn across on-coming traffic is likely to be significantly slower than a left hand turn that is not across traffic.

The or each trips passing through a determined route may subsequently be analyzed to determine the time taken for the or each trip to pass through the intersection; ie to determine the transit time, or at least to provide an estimation of the transit time.

The times for the trips that have been determined to have taken one of the predetermined routes may be averaged, thereby giving a more accurate overall time for that predetermined trip.

In some embodiments, the averages may be taken within predetermined time periods. In one embodiment, the trips are averaged according to the time at which the trip was made. Conveniently, the trips are averaged over periods of a predetermined length. It will be appreciated that traffic flow can vary significantly over the course of a day and as such using predetermined periods may increase the accuracy.

Some embodiments of the method may be arranged to analyse the averages to determine the quality of the average. If it is determined that the quality does not meet predetermined criteria then the averages may be modified.

In some embodiments, the length of the predetermined period of time may be increased thereby increasing the number of trips that fall within any one time period.

The method may be further arranged to analyse trips through an intersection into at least one of a pre intersection zones; inter intersections zones; and post intersection zones. The method may further comprise utilizing one or more of the pre, inter and post intersection zones as the transit time associated with an intersection.

Conveniently, the method applies a bounding box to road segments around an intersection. Such a method is convenient to determine this position data should be considered to be part of a path through an intersection.

The bounding box may be determined in terms of a predetermined distance from a point in the intersection. For example, the bounding box may be determined to be roughly 150 m from the intersection. The skilled person will appreciate that other distances may be suitable, such as roughly any of the following: 50 m, 75 m, 100 m, 125 m, 175 m, 200 m.

Alternatively, or additionally, the bounding box may be determined in terms of transit time from a point determined to be the intersection.

Intersections may be categorized according to a classification and the times taken for a trip to pass through intersections within the same, or at least similar categories, may be averaged. Such a method may be applied to averages previously determined in an aim to improve that average. Alternatively, or additionally, the classification may be used to determine the average.

The method may be arranged to use the trips derived from the position data to determine a set of equations in which the transit time through the intersections are unknown variables.

Further, the method may be arranged to process the set of equations to determine a transit time for at least some intersections. In some embodiments, the method determines the transit time by minimizing the error in the set of equations by determining a transit time for each category of intersection.

According to a second aspect of the invention there is provided a machine arranged to create map data comprising a plurality of navigable segments, representing segments of a navigable route in the area covered by the map, and intersections, representing intersection in the navigable route covered by the map, the machine comprising processing circuitry arranged to process position data derived from the positions of at least one vehicle over a period of time, the processing circuitry being programmed to:
  i. process the position data;
  ii. calculate from the processing of the position data a transit time or set of transit times for at least some of the intersections in the map data; and
  iii. generate further map data, which for at least some of the intersections therein, contains the calculated transit time or set of transit times associated with the intersection for which the calculation was made.

According to a third aspect of the invention there is provided map data comprising a plurality of navigable segments, representing segments of a navigable route in the area covered by the map, and intersections, representing intersections between the navigable segments covered by the map wherein at least some of the intersections have a transit time associated therewith that has been derived by averaging position data using the method of the first aspect of the invention.

According to a fourth aspect of the invention there is provided a machine readable medium containing instructions which when read by a machine cause that machine to perform the method of the first aspect of the invention.

According to a fifth aspect of the invention there is provided a machine readable medium containing instructions which when read by a machine cause that machine of function as the machine of the second aspect of the invention.

According to a sixth aspect of the invention there is provided a machine readable medium containing instructions which contain the map data of the third aspect of the invention.

According to a seventh aspect of the invention there is provided computerised method of creating map data from position data derived from the positions of at least one vehicle over a period of time, the map data comprising a plurality of navigable segments representing segments of a navigable route in the area covered by the map and the map data also comprising intersections between navigable segments representing intersections in the navigable route, the method comprising using a processing circuitry to perform the following steps:
  i. processing the position data;
  ii. calculating from the processing of the position data a transit time or set of transit times for at least some of the intersections in the map data;
  iii. clustering the calculated transit times within predetermined time periods in order to generate a transit time profile from the transit times; and
  iv. generating further map data containing the transit time profiles for intersections that have the transit time profile determined with intersections therein.

According to an eight aspect of the invention there is provided a computerised method of creating map data from position data derived from the positions of at least one vehicle over a period of time, the map data comprising a plurality of navigable segments representing segments of a navigable route in the area covered by the map and the map data also comprising intersections between navigable segments representing intersections in the navigable route, the method comprising using a processing circuitry to perform the following steps:
  i. processing the position data;
  ii. generating a set of equations from the processing of the position data in which transit times for intersections are an unknown variable;
  iii. calculating from the set of equations a transit time for at least some of the intersections in the map data; and
  iv. generating further map data containing the transit time for intersections that have the transit time calculated with intersections therein.

In any of the above aspects of the invention the machine readable medium may comprise any of the following: a floppy disk, a CD ROM, a DVD ROM/RAM (including a −R/−RW and +R/+RW), a hard drive, a solid state memory (including a USB memory key, an SD card, a Memorystick™, a compact flash card, or the like), a tape, any other form of magneto optical storage, a transmitted signal (including an Internet download, an FTP transfer, etc), a wire, or any other suitable medium.

Further, the skilled person will appreciate that features discussed in relation to any one aspects of the invention are suitable, mutatis mutandis, for other aspects of the invention.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIG. 6 shows, schematically, an intersection between two road segments;

FIG. 7 shows a first example intersection;

DETAILED DESCRIPTION OF EMBODIMENTS OF INVENTION

Embodiments of the present invention will now be described with particular reference to a PND (Portable Navigation Device). It should be remembered, however, that the teachings of the present invention are not limited to PND's but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, a map server (such as providing routing and navigation functionality over the internet), or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
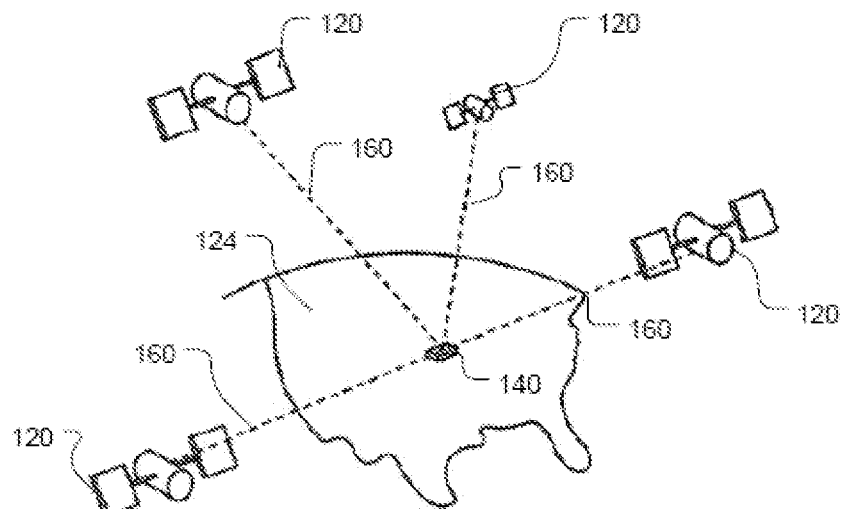
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units. However, it will be understood that Global Positioning systems could be used, such as GLO-SNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize an accurate frequency standard accomplished with an accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
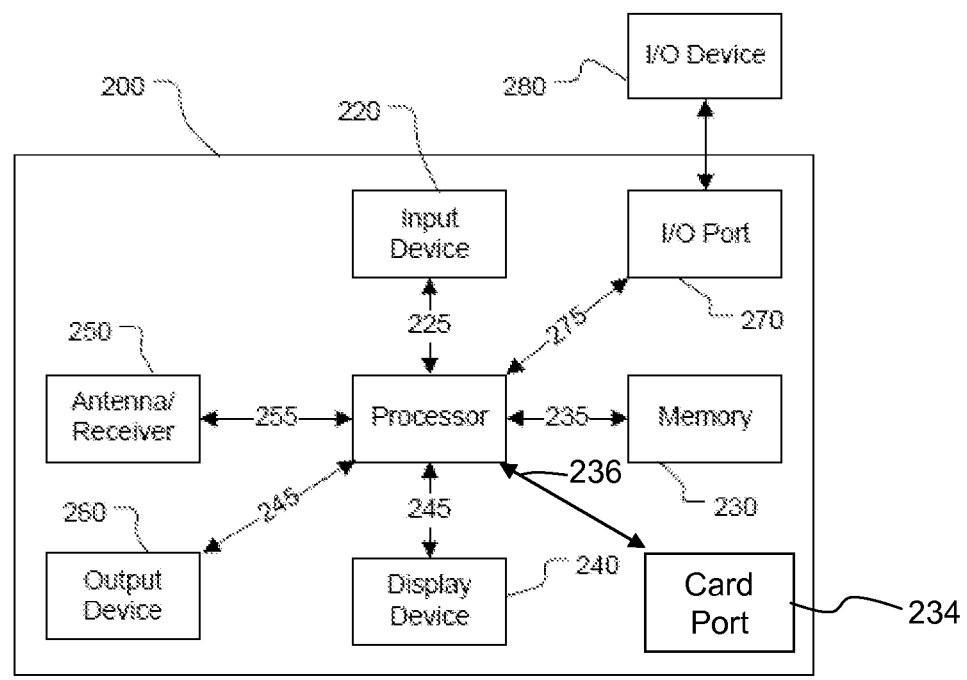
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touch screen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 comprises, for example, a volatile memory, such as a Random Access Memory (RAM) and a non-volatile memory, for example a digital memory, such as a flash memory.

The processor 210 may also communicate with a port 234, via a connection 236, into which a removable memory card (commonly referred to as a card) may be added to the device 200. In the embodiment being described the port is arranged to allow an SD (Secure Digital) card to be added. In other embodiments, the port may allow other formats of memory to be connected (such as Compact Flash (CF) cards, Memory Sticks™, xD memory cards, USB (Universal Serial Bus) Flash drives, MMC (MultiMedia) cards, SmartMedia cards, Microdrives, or the like).

The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
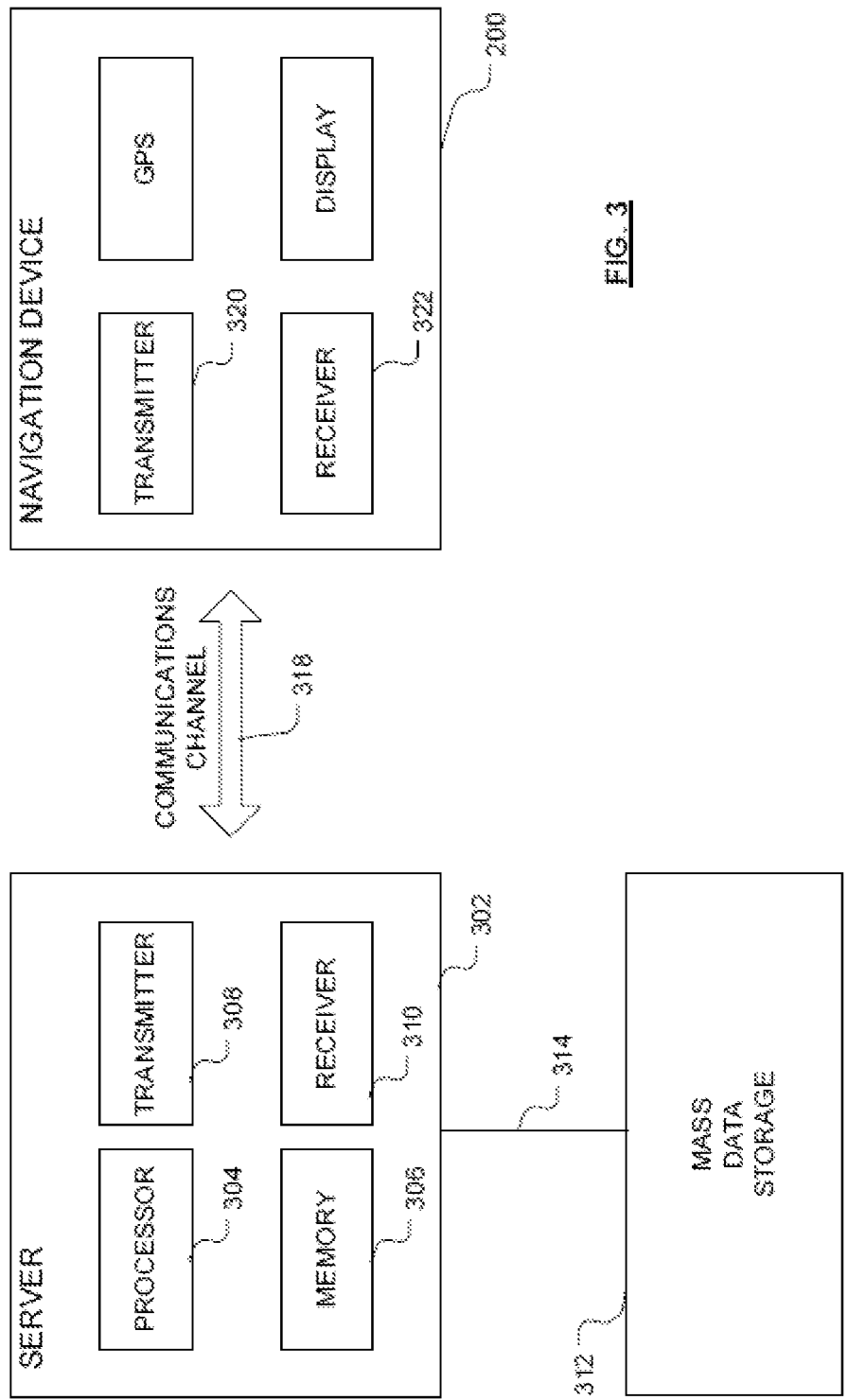
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

Further, the processor 210 is arranged, from time to time, to upload the record of the whereabouts of the device 200 (ie the GPS data and the time stamp) to the server 302. In some embodiments in which the navigation device 200 has a permanent, or at least generally present, communication channel 318 connecting it to the server 302 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 210 may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the navigation device may be arranged to buffer the GPS fixes within the memory 230 and/or on a card inserted in the port 234 and to transmit these when a predetermined number have been stored. This predetermined number may be on the order of 20, 36, 100, 200 or any number in between. The skilled person will appreciate that the predetermined number is in part governed by the size of the memory 230/card within the port 234.

In other embodiments, which do not have a generally present communication channel 318 the processor 210 may be arranged to upload the record to the server 302 when a communication channel 318 is created. This may for example, be when the navigation device 200 is connected to a user's computer. Again, in such embodiments, the navigation device may be arranged to buffer the GPS fixes within the memory 230 or on a card inserted in the port 234. Should the memory 230 or card inserted in the port 234 become full of GPS fixes the navigation device may be arranged to deleted the oldest GPS fixes and as such it may be thought of as a First in First Out (FIFO) buffer.

In the embodiment being described, the record of the whereabouts comprises one or more traces with each trace representing the movement of that navigation device 200 within a 24 hour period. Each 24 hour period is arranged to coincide with a calendar day but in other embodiments, this need not be the case.

Generally, a user of a navigation device 200 gives his/her consent for the record of the devices whereabouts to be uploaded to the server 302. If no consent is given then no record is uploaded to the server 302. The navigation device itself, and/or a computer to which the navigation device is connected may be arranged to ask the user for his/her consent to such use of the record of whereabouts.

The server 302 is arranged to receive the record of the whereabouts of the device and to store this within the mass data storage 312 for processing. Thus, as time passes the mass data storage 312 accumulates a plurality of records of the whereabouts of navigation devices 200 which have uploaded data.

The mass data storage 312 also contains map data. Such map data provides information about the location of road segments, points of interest and other such information that is generally found on map.

As a first process, the server 302 is arranged to perform a map matching function between the map data and the GPS fixes contained within the records of the whereabouts that have been received. Such map matching may be performed in a so-called real time manner; ie as the records of whereabouts are received or may be performed a time later after the records of the whereabouts have been recalled from the mass data storage 312.

In order to increase the accuracy of the map matching, pre-processing of the records of the whereabouts is performed as follows. Each GPS trace (ie a 24 hour period of GPS data) is divided into one or more trips with each trip representing a single journey of the navigation device 200 which are subsequently stored for later processing.

Within each trip GPS fixes whose accuracy report received from the navigation device is not sufficiently high are rejected. Thus, in some embodiments, a fix may be rejected if the accuracy report indicates that the signals from less than three satellites 102 were being received by the navigation device 200 in relation to that GPS fix. Further, each trip is clipped when the reported time between fixes goes above a threshold value. Each trip that passes this pre-processing stage is passed to be map matched.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
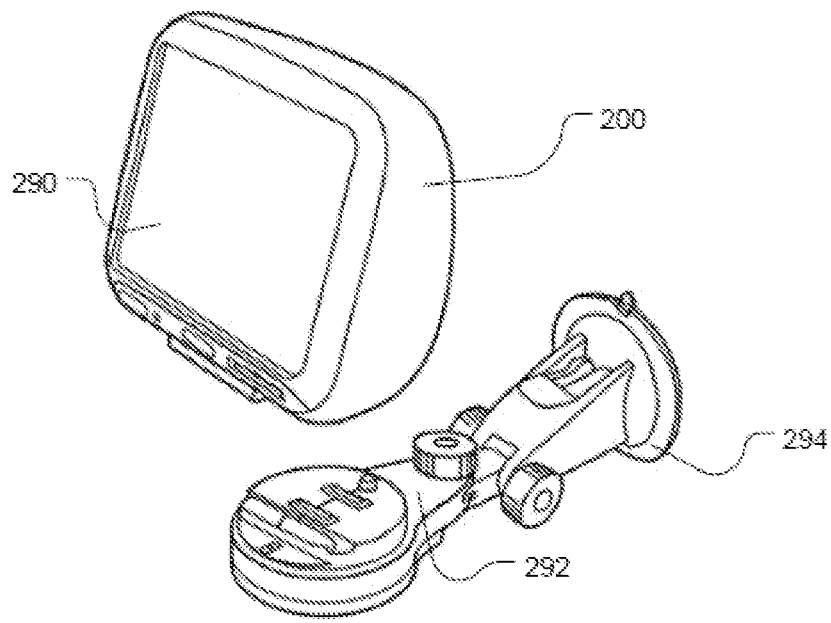
FIGS. 4A and 4B are illustrative perspective views of a navigation device.
Figure 4B:
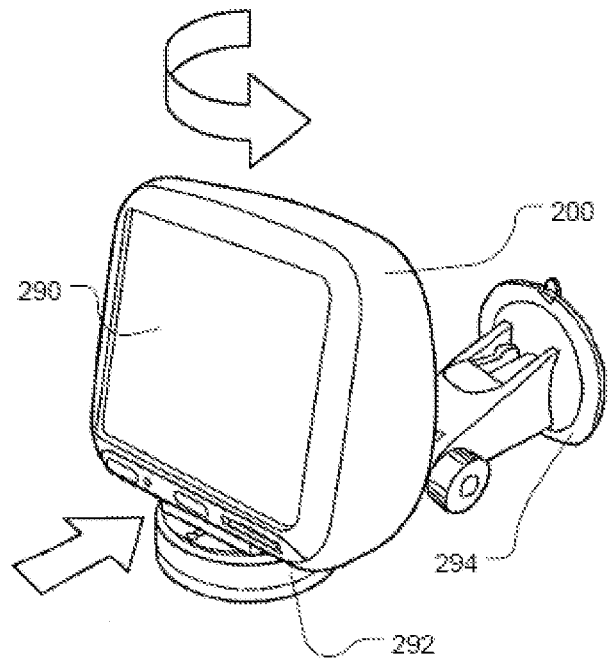

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 5:
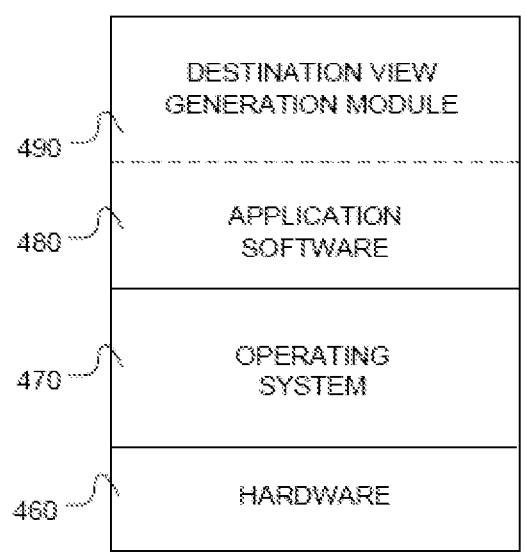
FIG. 5 is a schematic representation of the software employed by the navigation device.

Referring now to FIG. 5 of the accompanying drawings, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the GUI that supports core functions of the navigation device 200, for example map viewing, route planning, navigation functions and any other functions associated therewith.

In use, the PND 200 contains in the memory 230, or elsewhere, map data representing navigable routes within the area covered by the map data. An example of such a navigable route 600 is shown in FIG. 6. In the example being described, FIG. 6 shows a road 602 stretching from point TA to TB together with a so-called 'T-junction' connecting the road 602 to point TC via a second road 604.

For the PND 200 to have utility it is used in an area covered by the map data. As it is moved within the area the PND 200 periodically determines its position from the GPS system as described above and records that position. This is represented in FIG. 6 by the dots 606 shown therein. There are inherent inaccuracies within the system and it is possible for the PND 200 to determine that its position is out with the road segment 602, 604 as exemplified by the dot 606a. This can be accounted for in later processing as described hereinafter and will be fully appreciated by the skilled person.

In the route shown in FIG. 6, the PND 200 makes a journey 607 from point TA toward point TB and takes a left turn at the T-junction to turn onto road 604 toward point TC. In order to make this turn, the vehicle in which the PND 200 is travelling decelerates in the zone 608, represented by the grey box. This zone 608 may be thought of as a deceleration (or pre intersection) zone or a pre-maneuver path. The vehicle then makes the turn and subsequently accelerates up to speed whilst in the zone 610 (again represented by the grey box). Thus, the zone 610 may be thought of as an acceleration (or post intersection) zone or a post-maneuver path.

Thus, in the journey represented by FIG. 6, the vehicle in which the PND 200 is situated travels along a road segment, makes a turn and travels along a second road segment.

In some embodiments, data is held within the map data for each road segment (having a linear spatial extent) giving what may be termed a speed profile for that segment which may be provided in terms of average speed values; In other embodiments, the speed profile may alternatively be modeled equivalently as an average transit time for that road segment, taking into account the length of the road segment at hand. Given that junctions/intersections/road crossing have no, or a less clear and possible artificial, spatial extent in a network model of the road network, intersection maneuver profiles are not readily expressed in terms of average speeds, are more readily expressed in terms of transit time or a set of transit times. It may also be possible to express the transit time through the intersection as a transit time offset, complementing the sum of road segment transit times along a certain itinerary which is "lost" when slowing down, waiting, and accelerating or the like.

A set of transit times may be thought of as a transit time profile. Such a transit time profile may provide transit times at predetermined intervals. For example the transit time profile may provide the transit time at hour long intervals.

Maneuver-related transit time costs may be associated with some or all trajectories, or a subset of significant trajectories, along which a vehicle can drive through an intersection.

An example of relevant trajectories is reviewed hereafter. The intersection shown in FIG. 6 is relatively simply and a more complex intersection is shown in FIG. 7 and is what would generally be termed a cross-roads. Whether or not turn restrictions are taken into consideration and thus only allowable driving maneuvers are addressed is an implementation choice.

For a 4-way intersection (ie a cross roads) involving road segments A, B, C, and D (with A←→C having right of way), the following trajectories would be the most obvious candidates for transit time profiles: B→C, B→D, B→A, D→A, D→B, D→C.

Additionally, there may be further candidates (assuming right-hand traffic in this example), A→B and C→D, which as left turns may take an additional time. For example, it is conceivable that a further half a minute may be taken in such a maneuver during heavy traffic.

Such information is a property of the two road segment both before the turn due to a deceleration zone (e.g., A) & after the turn due to an acceleration zone (e.g., B). Attaching a "transit time cost" attribute to A or B, respectively, does not model the turn appropriately since the time taken to make the turn is a property of both road segments; conveniently therefore, the time is an attribute of the directed pair A→B. That is the transit time through the intersection is dependent upon the route taken through the intersection (as well as on other factors such as density of traffic, etc.).

Also, there may be u-turn cases to be covered, such as A→A or C→C when assuming for instance medians, traffic islands, or other kinds of dividers between opposite driving directions.

Finally, the balance of all pairs not included above may be covered (explicitly, or implicitly by means of defaults): A→C, A→D, B→B, C→A, C→B, D→D.

Figure 8:
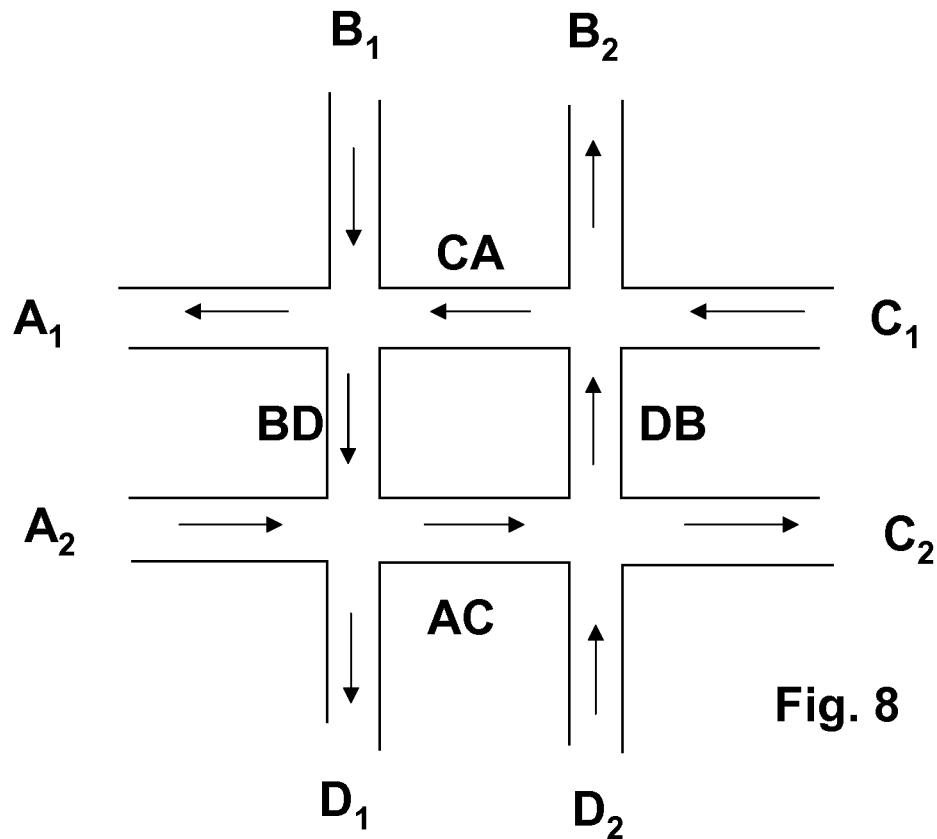
FIG. 8 shows a second example intersection, more complex than the first.

In more complicated cases of complex intersections involving multi-carriageways, slip roads, etc. the model may even relate to 3 or more segments as expanded upon in relation to FIG. 8 which shows an example of a 4-way involving multi-carriage ways, relevant trajectories often involve intersection-internal connectors—namely AC, DB, CA, and BD—, for the moment disregarding potential additional maneuver-specific turn lanes or slip roads. As before, A←→C (short-hand for A2→C2 and C1→A1) is assumed having right of way and right-hand traffic.

Most obvious candidates for transit time profiles would be:
B1→BD→AC→C2,
B1→BD→D1,
B1→A1,
D2→DB→CA→A1,
D2→DB→B2,
D2→C2.

Further candidates may be: A2→AC→DB→B2 and C1→CA→BD→D1, which as left turns may be affected by additional wait time during heavy traffic along A←→C.

Also, there may be u-turn cases to be covered, including A1→AC→DB→CA→A2 and C1→CA→BD→AC→C2 as well as B1→BD→AC→DB→B2 and D2→DB→CA→BD→D1, which like before-mentioned left turns may be affected by additional wait time during heavy traffic along A←→C.

Finally, the balance of all pairs not included above may be covered (explicitly, or implicitly by means of defaults):
A2→AC→C2,
A2→D1,
C1→CA→A1,
C1→B2.

Considering a driver coming along A2 and wanting to turn into B2, heavy-traffic on C→A1 might cause a significant amount of wait time while residing on DB. Similarly, a wait time on DB may occur for a driver approaching from D2, with a destination towards A1 or B2. Embodiments of this invention allow such cases to be allowed for when estimating a journey time across that intersection. This may include waits at traffic light regulated intersections of multi-carriageways, etc.

In use, the speed profile associated with the road segments and routes through intersections is created from position data and in particular from the trips that have been derived from the GPS traces as described above. In the embodiment being described such position data has been collected from PND's and the GPS receivers therein. However, this need not be the case.

There may be several specialization methods available for determining comprehensive data representing transit time delays through a particular intersection and two such specialization methods are outlined below.

The first method targets individualized transit time profiles and analyses position data to assess the time implications for various intersection trajectories and attempts to provide the transit time effect of a lowered average speed along a given maneuver in a given time interval.

This method may be broken down into a number of sub-tasks, each of which also comprises a number of steps. In the first sub-task trips are associated with intersections between the road segments held in the map data.

Figure 10:
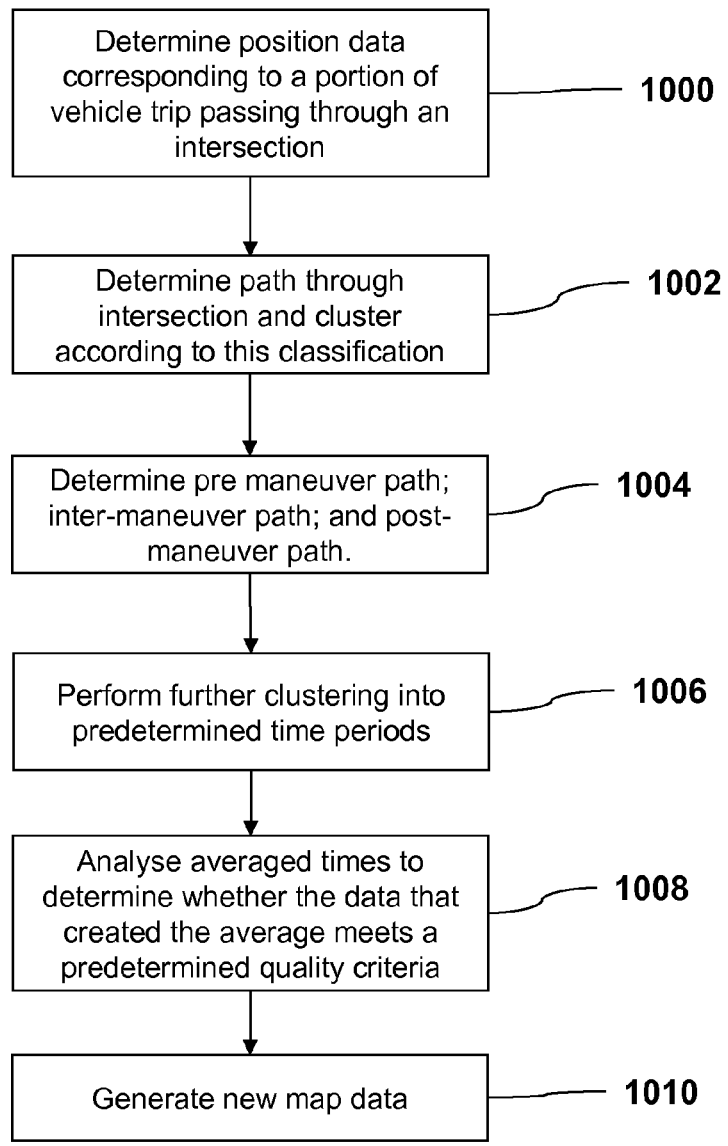
FIGS. 10 and 11 shows flow charts outlining embodiments of the invention.

For this, the set of trips is determined that is relevant for a given intersection. This may comprise the following steps in this or modified order (described with reference to FIG. 10):

i. Determine connectivity to/from a given intersection using the map data; this results in a sub-network for the intersection at hand (i.e. its "coboundary" in terms of all road segments topologically connected with the intersection).

ii. Apply spatial filtering of GPS fixes within the trips being processed by using a bounding box around the intersection at hand; the size of the bounding box may be chosen based on the spatial extent of the intersection's sub-network or based on default dimensions optimized for data retrieval or other reasons. That is, a determination is made of the which GPS fixes correspond to a portion of a trip passing through an intersection—step 1000. The skilled person will appreciate that a GPS fix corresponds, in embodiments using GPS, to a vehicle position at a given moment in time.

iii. Perform map-matching for spatially-filtered GPS fixes by determining for each of the GPS fixes the nearest position (if applicable) on a road segment of the corresponding intersection's sub-network (ie GPS fixes such as 606a would be associated with the nearest road segment 602). Map-matching may deploy more sophisticated matching criteria, including but not limited to: GPS & map accuracy conditions; geometric proximity; GPS speed & map attribute proximity; GPS & road segment directionality; dependencies between neighboring data points. This may also be considered to be part of step 1000.

Alternatively, the generation of transit time profiles may take advantage of position data processing that has been performed for other purposes, such as for the generation of speed profiles for road segments, which may already provide—as a spin-off for transit time profiles—a map-matched layer of GPS traces and/or trips.

Further position data processing steps for a given intersection include (steps in this or modified order):

iv. Determine for each spatially-filtered and map-matched trip its intersection trajectory, in terms of its path of traversed road segments corresponding to the map-matched GPS fixes. This is shown as step 1002 and may be thought of as classifying the position data related to the intersection according to a route through the intersection.

v. Cluster all trips based on their trajectory through the intersection, leading to a categorization of trips by driving maneuver (which may be thought of as "maneuver-matched GPS trips"). GPS trips which happen to start or end at the intersection at hand are, in this embodiment, discarded. This may be thought of as being part of step 1002.

vi. Determine the (minimum) length of the maneuver-matched GPS trips to be taken into account; In order to achieve this the following criteria may be applied: sufficient GPS fix coverage before (respectively after) a given intersection shall extend across at least one whole road segment, or possibly multiple connected road segments, for which a speed profile is established; or alternatively a certain predetermined distance D (say roughly 150 m) which may be subject to fine-tuning; or distance D as minimum road segment length threshold for selecting one or multiple whole road segments.

vii. Perform core segmentation of each maneuver-matched GPS trip to determine the primary sub-path:

Pre-maneuver path, comprising GPS fixes matched to approaching road segment(s);

viii. Optionally, perform more comprehensive segmentation of each maneuver-matched GPS trip to further determine other sub-path(s):

Inter-maneuver path, comprising GPS fixes matched to road segment(s) modeled as part of the intersection representation in the map database;

and/or

Post-maneuver path, comprising GPS fixes matched to departing road segment(s);

These steps are shown within step 1004.

At sub-path borders, a GPS fix may belong to both, pre-maneuver path & inter-maneuver path or inter-maneuver path & post-maneuver path, respectively. In the (common) case of "simple" intersections/road-crossings, such as the above-mentioned ABCD example shown in FIG. 7, the inter-maneuver path of a given GPS trace may be "empty" and its GPS fixes either belong to its pre- or post-maneuver path.

ix. Apply secondary clustering of maneuver-matched GPS trips on the basis of a predefined time interval scheme, such as discrete time slots per time of day/day of week, in order to establish a normal transit time profile which corresponds to recurring patterns.

The discrete time slots may for example correspond to roughly hour long time bins so that, for example, each maneuver-matched GPS trip that occurred between a first time (eg 9 am) and a second time (eg 9:59 am) are placed within the same time bin. The skilled person will appreciate that the time bins may have other lengths other than 1 hour—for example roughly any of the following: 10 minutes, 15 minutes, 20 minutes, 30 minutes, 45 minutes, 2 hours, 6 hours, 12 hours or any time in between these lengths.

This is shown in step 1006 and may be thought of as averaging the time within predetermined time periods, which in this example are of a predetermined length.

x. Optionally, apply a parallel secondary clustering of the same maneuver-matched GPS trips on the basis of irregular time pattern that do not occur daily/weekly, such as national holidays or festivals, in order to establish an abnormal transit time profile, which corresponds to irregular patterns and which—if applicable—overwrite a normal transit time profile. Maneuver-matched GPS trips taken into account for abnormal transit time profiles are excluded from secondary clusters created for normal transit time profiles.

Such a secondary parallel clustering would allow the transit time profile for an intersection to be mapped for days for which traffic flow does not fit a 'normal' pattern such as a national holiday, etc. Thus, when the speed profile is later used for route planning it is possible to use a transit time profile for that intersection that more accurately reflects the likely traffic flow irrespective as to whether the traffic flow for that day is likely to be 'normal' or 'abnormal'.

xi. Assess temporal behavior of pre-maneuver GPS fixes by averaging over each secondary cluster of maneuver-matched GPS trips. In particular, assess whether one can observe a drop in average speed of pre-maneuver GPS fixes (as a comparison with the speed profile of the corresponding road segment(s)).

If assessment is positive (ie the speed in the secondary cluster is lower than the average speed for that road segment as a whole), determine a pre-maneuver time penalty for the assessed maneuver & time interval at hand, which equates to the length of the corresponding road segment(s) divided by the absolute difference of the average speed comparison.

On the contrary, if assessment is negative (ie there is no speed difference between the secondary cluster and the average speed of that road segment), the pre-maneuver time penalty is declared zero (and/or flagged as not applicable) for the assessed maneuver & time interval at hand.

xii. In a similar way, if comprehensive segmentation of post-maneuver paths is applicable, assess temporal behavior of post-maneuver data points by averaging over each secondary cluster of maneuver-matched GPS traces.

If assessment is positive (ie the speed in the secondary cluster is lower than the average speed for that road segment), then determine a post-maneuver time penalty for the assessed maneuver & time interval at hand, which equates to the length of the corresponding road segment(s) divided by the absolute difference of the average speed comparison.

On the contrary, if assessment is negative (ie the speed in the secondary cluster is the same or higher than the average speed for that road segment), then the post-maneuver time penalty is declared zero (and/or flagged as not applicable) for the assessed maneuver & time interval at hand.

xiii. Alternatively, if comprehensive segmentation of post-maneuver paths is applicable, assess combined temporal behavior of pre-maneuver & post-maneuver GPS fixes by averaging over each secondary cluster of maneuver-matched GPS trips. In particular, assess whether one can observe, on average, a significant time gap between the last (or last few) time stamp(s) for the GPS fixes of any given pre-maneuver path and the first (or first few) time stamp(s) of the GPS fixes of the related post-maneuver path.

If assessment is positive, determine a pre-post-maneuver time penalty for the assessed maneuver & time interval at hand, which equates to the averaged overall time gap, including the (implicit) inter-intersection delay, if applicable.

On the contrary, if assessment is negative, the pre-post-maneuver time penalty is declared zero (and/or flagged as not applicable) for the assessed maneuver & time interval at hand.

xiv. In addition or alternatively, if comprehensive segmentation of inter-maneuver paths is applicable, assess speed behavior of inter-maneuver GPS fixes (if existing) by averaging over each secondary cluster of maneuver-matched GPS traces. In particular, assess whether the average of all speeds associated with the inter-maneuver data points is significantly lower than the average speed of the related pre- and post-maneuvers (as a comparison with the speed profile of the corresponding road segment(s), whereby all average speeds are determined according to the same principles).

If assessment is positive, determine a relative inter-maneuver time penalty for the assessed maneuver & time interval at hand, which equates to the length of the inter maneuver path divided by the absolute difference of the average speed comparison. In addition or alternatively, determine an absolute inter-maneuver time penalty for the assessed maneuver & time interval at hand, which equates to the length of the inter maneuver path divided by the average speed for the inter-maneuver path.

On the contrary, if assessment is negative, the inter-maneuver time penalty is declared zero (and/or flagged as not applicable) for the assessed maneuver & time interval at hand.

A final set of GPS fix processing steps for a given intersection include:

xv. Validate the statistical significance and/or confidence of each derived time penalty for a given secondary cluster of maneuver-matched GPS trips and for a given time interval. That is the averages derived from the clustering are analysed to determine whether the data that generated the averages meets predetermined quality criteria step 1008.

If validation indicates that position data is too coarse, apply a fall-back strategy (which may be termed "gap filling"); reiterate the secondary clustering step (as well subsequent temporal maneuver behavior assessment step(s)) by applying a lower-resolution time interval scheme (either for the time interval at hand, or for similar or all time intervals). That is if previously the length of time of a time bin was one hour then a new, longer, length (for example initial a time bin of 3 hours may be set) in order that a greater number of GPS trips fall into the longer time bin. If the position data is still too coarse then further lengthening of the time bins may occur.

In a primary fall-back response, utilize generalization towards bigger samples of maneuver-matched GPS trips spanning a longer time period, such as rush-hours vs rest of day time vs night time. Such merging of time intervals may be based on traffic density patterns that can be observed for speed profiles for road segments.

As a secondary fall-back response (assuming a persisting lack of satisfactory GPS fix coverage and/or density), utilize classification of intersections (rather than trying to form a speed profile for each individual intersection) as a basis for comparison and harmonized treatment such that a speed profile is developed for a set of intersections having similar characteristics. In this way, transit time profiles for intersections with same/similar characteristics (such as road class, form of way, speed profiles of connected road segments, urban vs non-urban setting, and the like) may be shared for gap filling across cases with insufficient GPS fixes.

As a third fall-back response, the second specialization method of determining the transit time delay details an approach for intersection turn categorization, as described further below.

As an option, if validation indicates that position data has potential for higher granularity, reiterate the secondary clustering step (as well subsequent temporal maneuver behavior assessment step(s)) by applying a higher-resolution time interval scheme (either for the time interval at hand, or for similar or all time intervals).

xvi. Determine the time offset (total "time loss"), measured in a given time unit, for a given cluster of maneuver-matched GPS trips in a given time interval (ie time bin). Different strategies may be applied as follows:

Most commonly, based on core segmentation of pre-maneuver paths, the time offset equals the pre-maneuver time penalty. The skilled person will appreciate that most time lost at an intersection is within the pre-maneuver path (608 in FIG. 6) in which the deceleration occurs and in which any queuing is also likely to occur.

Alternatively, based on comprehensive segmentation including inter-maneuver paths and/or post-maneuver paths (as appropriate), the time offset equals the sum of pre-maneuver time penalty; post-maneuver time penalty; relative inter-maneuver time penalty (if applicable).

As a second alternative, also based on comprehensive segmentation including inter-maneuver paths and/or post-maneuver paths (as appropriate) and further anticipating the scope of speed profiles for road segments being exclusive of intersection internal connectors, the time offset equals the sum of pre-maneuver time penalty; post-maneuver time penalty; absolute inter-maneuver time penalty (if applicable).

As a third alternative, also based on comprehensive segmentation including at least post-maneuver paths, the time offset may equal the pre-post-maneuver time penalty.

xvii. Assemble a profile of time costs for each intersection maneuver in terms of time offsets in function of time of day/day of week, and—if applicable—in function of the abnormal time interval scheme.

A turn cost profile can be modeled as discretized averages of time offsets or as parametric function; time offsets may be specified as absolute or classified (coded) values, or as parameter of a time offset function.

A dataset of transit time profiles—generated according to above steps or otherwise—is in one embodiment provided as a complete time-dependent turn cost matrix per intersection, covering all combinations of approaching road segment→departing road segment, or a reduced matrix with significant turns only (for all or a sub-set of intersections in a map database). Such matrices may be organized in a database, table or list structure (either together with speed profiles for road segments or separately); they may by made available as content file(s), software library or via web service(s). A dataset of transit time profiles may be stored and managed as integral part of map database content or may be treated as add-on data, such as supplementary look-up tables.

In another embodiment, being equivalent to the previous, the content of the turn cost matrix may be recast by transferring time offset profiles into attribute sets that are attached to the various approaching road segments. This means that for every possible maneuver of a particular approaching road segment in a given road segment direction, topological time cost profile attributes are attached which comprise:

directionality towards concerned intersection/road crossing, and/or map data reference (ID) of concerned intersection/road crossing;

map data reference (ID) to applicable departing road segment;

time cost profile.

In addition or as further alternative, the before-mentioned model (time cost profiles as attribute sets of approaching road segments) may be adapted such that the actual maneuver semantics in topological terms ("segment A→segment B") are translated into geographic/geometrical terms ("left turn", "+90° turn", "turn towards north-east", and the like). Each transit time profile would therefore be described by a quantified relative or absolute turn angle, and/or classified relative or absolute turn semantics. For operational use, such geographic/geometrical time cost profile attributes simplify the map database model for transit time profiles as they do not make use of map data references (IDs). Depending on the targeted usage by an application, this attribute model has both merits (e.g., more intuitive representation for a human-machine-interface) and demerits (e.g., requiring interpretation by a route planer at run-time).

Geographic/geometrical time cost profile attributes facilitate expanded capabilities of safety and efficiency application, in that they easily translate into visualization properties (possibly in conjunction with other time-dependent and/or dynamic road or environmental properties). Color-coded icons for the range of possible turn maneuvers along a given street or route, or in a given area, may for instance indicate some form of rating of level of throughput.

In a further embodiment, the data representation of turn cost profiles would take into account the main driving direction(s) at a given intersection/road crossing which typically corresponds to the straight (or close to straight) through-path(s) from any given approaching road segment. Main driving directions serve as reference transit time profiles, in terms of their respective time offset at a given time/day; the time offset profiles of the remaining maneuvers at the intersection/road crossing at hand, having the same approaching road segment, are then represented as differential penalties relative to the reference time offsets. As a result, the applicable differential penalty for a given turn and given time interval may be negative or positive, i.e. designating a delay or gain in transit time, respectively (it is an implementation choice whether negative indicates time delay or gain). The actual reference time offsets may be assumed as zero, or disregarded, by an application in case the speed profiles for road segments are assumed to adequately cover speeds/transit times along main directions (including intersection crossing maneuvers). Differential penalty profiles enhance state-of-the-art solutions which otherwise (without time-dependent profiles) have to assume a constant penalty, or somehow categorized pattern of penalties, for maneuvers other than the main direction(s).

A variation of the before-mentioned embodiment is the use of a "zero time loss" maneuver, or "least time loss" maneuver, as reference maneuver for deriving differential penalty profiles for any other maneuvers at a given intersection and the reference maneuver's approaching road segment at hand. Determination of "zero time loss" maneuvers, or "least time loss" maneuvers, can be based on the process for generating transit time profiles (as described or done another way), which allows to determine which maneuvers are natural continuations without, or with the least, slow-down and time offset. Once known, such natural continuation(s) are turned into the reference for generating differential penalty profiles for any other turns at a given intersection and approaching road segment; in this embodiment variation, differential penalties would always be negative (or always positive, as per the implementation choice) and would always designate time delays compared to the respective fastest, or least impedance, reference maneuver.

For integrated solutions (transit time profiles managed as part of routing applications' road network map database), existing data structures may be re-used or amended.

In the case of a routing application using pre-generated turn cost matrices (for certain or all classes of intersections/road crossings), static turn cost data may be supplemented/overridden by time-dependent turn costs.

Concerning the equivalent representation of topological time cost profile attributes, these may or may not correspond to the way a routing application accesses and processes turn cost data.

Geographic/geometrical time cost profile attributes would typically be a new set of attributes that need to be made accessible for a routing application.

Differential penalty profiles would target the current practice of time-sensitive routing engines, such as TomTom IQ Routes, minimizing run-time calculation complexity. The speed profile associated with a road segment approaching an intersection/road crossing would be supplemented with a set of additional maneuver-sensitive transit time profiles that take into account the differential penalty for a given maneuver possible at the approached intersection/road crossing at hand. With reference to the above-mentioned A/B/C/D example of a 4-way crossing, of FIG. 7, and when approaching from A, the speed profile for road segment A is complemented with two further transit time profiles, one corresponding to the A→B turn maneuver and another one corresponding to the A→D turn maneuver (each profile in terms of a combined profile of speed & differential penalty for any given time/day). For the main direction A→C, being the reference maneuver, the differential penalty would be (assumed) zero.

Figure 9:
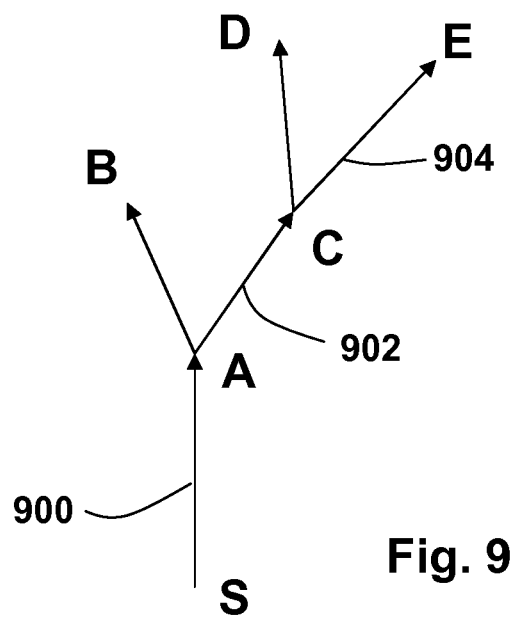
FIG. 9 shows a plan of a route between various nodes.

A second method of determining the transit time delay is now outlined with reference to FIG. 9, specialising in regards to a generic transit time cost function based on categorization of turn types.

Any one journey is constructed of many such traversals of road segments followed by turns. As discussed above, each turn may be thought of as a pre-, inter- and post maneuver portion. However, looking at FIG. 9, a journey from S to E comprises the road segments 900 (SA), 902 (AC) and 904 (CE), together with a intersection at A and at C.

Thus, the total journey time, which can be thought of as a time cost, to reach a certain point in the journey is given by the sum of the time needed to drive the road segment coming from the previous intersection plus the turn cost (the time needed to reach that road segment; ie the transition time from a previous road). Considering FIG. 9 we will denote by $D_{i\_j}$ the driving cost from the intersection i to the intersection j and $Tc_{ij\_jk}$ the turn cost to move between the road segment between intersections i and j and the road segment between the intersections j and k.

In this case the cost to reach the nodes in the graph from the source node S would be:

$C_S = 0$ $C_A = D_{S\_A}$, $C_B = D_{S\_A} + Tc_{SA\_AB} + D_{A\_B}$, $C_C = D_{S\_A} + Tc_{SA\_AC} + D_{A\_C}$, $C_D = D_{S\_A} + Tc_{SA\_AC} + D_{A\_C} + Tc_{AC\_CD} + D_{C\_D}$, $C_E = D_{S\_A} + Tc_{SA\_AC} + D_{A\_C} + Tc_{AC\_CE} + D_{C\_E}$ (equation 1)

The driving time along a road segment is given by the ratio between the length of the line and the driving speed, for example $$D_{S\_A} = \frac{l_{SA}}{v_{SA}}.$$

The length is normally fixed and the speed can be measured from the position data that is being processed; for example GPS fixes (ie vehicle positions). In comparison the turn costs are more un-deterministic because the turns are punctual in the map representation while, while as discussed above, the turning time is distributed over some distance in the actual driving and is likely to be spread over a plurality of road segments. For example, the turning time is made up of the time in the pre- and post-maneuver zones together with time in the intersection (the inter intersection time).

This makes the intersection delay difficult to estimate and the values can be different in similar circumstances. In this, the second method, a statistical approach is used and the different turn costs are categorized into predetermined categories and an average time for the intersection delay is estimated for each category.

The roads have attributes like measured speeds (average or speed profiles) the road form describing the road configuration (freeway, multi-carriage, single carriage, etc.) or the road importance for the road network. Considering that an intersection may be viewed as a link between two roads any combination of these attributes could define an intersection category. The more input data that exists then the more categories that can be considered and the more precise the transit time should be estimated. However, there are down sides to having too great a number of categories in that redundancy may be introduced. There is likely to be a balance between accuracy and being overly complex.

There are several ways to group the turn costs (the time that can be assigned to a route through an intersection as discussed above in relation to FIG. 7):

For example, it may be possible to use the angle difference between the incoming and the outgoing roads segments. In such an embodiment, a number of sectors (which in the embodiment being descried is 8 but may be any other number such as 4, 16, 32, etc) are created and the angular difference between the road segments at the intersection is used to categorize the intersection into the category. For example, in the current embodiment between 0 and 44° is category 0; 45° and 89° is category 1; 90° and 134° is category 2; 135° and 179° is category 3; 180° and 224° is category 4; 225° and 269° is category 5; 270° and 314° is category 6; and 315° and 359° is category 7. Thus, each sector becomes a turn cost category.

In other embodiments, it may be possible to additionally, or alternatively, to use the road form, type or importance (the road classification) of the incoming and the outgoing road segments to the intersection.

In other embodiments, it may be possible to additionally, or alternatively, to use the difference in the driving speed between the incoming and the outgoing roads to an intersection. This criteria may overlap partially with the previous one and may lead to redundancy.

The categories may be map specific or country specific considering that the structure of the road network can be quite different from country to country.

Figure 11:
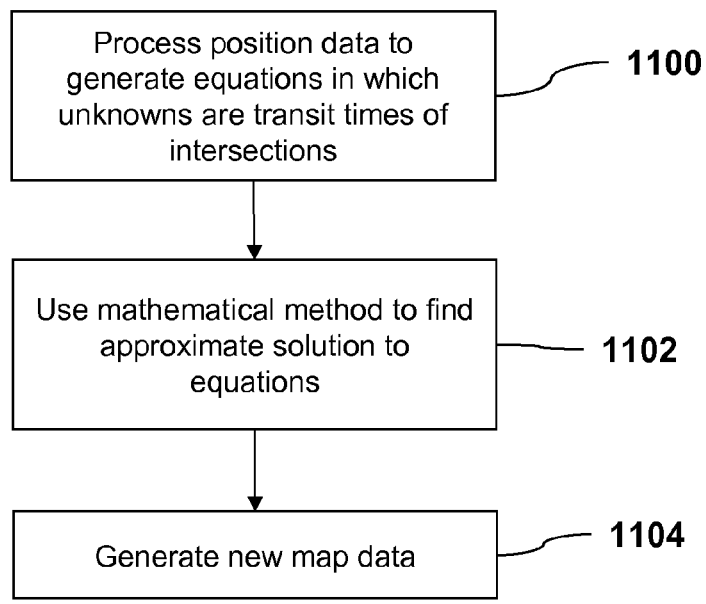

Each journey may be represented by an equation similar to equation 1. Thus, GPS trips that are collected from position data can be processed to represent each trip by such an equation. Thus, referring to FIG. 11, a first step is to process the position data to generate a set of such equations. As such a set of linear equations are generated in which the turn costs are unknown variables; the journey time for each road segment is estimated from the segment speed profiles (which may be obtained from map data or generated from position data) and the road length. The journey total time is given by the difference between the start and the end time.

Processing position data gathered allows a large number of GPS trips to be analyzed which should imply that the number of equations will exceed the number of unknowns. The resulting linear system can be solved in a least square meaning. This means that we will look to find that set of turn costs that would minimize the error between the predicted transit time and the real transit time (which is know from the GPS trip).

The cost structure is composed of the driving cost (ie time to drive the road segment) and the turn cost (ie the time lost in the intersection). The total traveling cost S is given by $$S = \sum_{i=1}^{n} D_i + \sum_{j=1}^{m} Tc_j$$

where $D_i$ are the driving time for each road belonging to the road and $Tc_j$ are the turn costs (expressed in time) along the route.

It is assumed that the measured speeds are correct and the method tries to optimize the estimation through the turn costs.

The method assumes that there are N types of turns defined into the cost model. Referring to the discussion above, in an embodiment which used 8 categories related to the angular relationship between the incoming and outgoing road segment then N=8. If we denote the types of turns by $Tc_1$ to $Tc_N$ than for the route number k we will have $$S_{drv}^k - \sum_i D_i^k = A_1^k Tc_1 + \ldots + A_N^k Tc_N$$

where $S_{drv}^k$ is the driven time along the route and $A_1^k, \ldots, A_N^k$ are the frequency of each type of turn in the total turn cost for the route k.

For example, in the present embodiment in which N=8, $A_1^k$ would indicate how many times we have a straight driving, $A_2^k$ a 45 degrees right turn, and so on.

If we consider several routes from k=1, . . . , L than we will get the following linear system:

$$\begin{bmatrix} S_{drv}^1 - \sum_i D_i^1 \\ \vdots \\ S_{drv}^L - \sum_i D_i^L \end{bmatrix} = \begin{bmatrix} A_0^1 & \ldots & A_N^1 \\ \vdots & \ddots & \vdots \\ A_0^L & \ldots & A_N^L \end{bmatrix} \begin{bmatrix} Tc_1 \\ \vdots \\ Tc_N \end{bmatrix}$$

Defining $$A = \begin{bmatrix} A_1^1 & \ldots & A_N^1 \\ \vdots & \ddots & \vdots \\ A_1^L & \ldots & A_N^L \end{bmatrix},$$

$$b = \begin{bmatrix} S_{drv}^1 - \sum_i D_i^1 \\ \vdots \\ S_{drv}^L - \sum_i D_i^L \end{bmatrix} \text{ and } x = \begin{bmatrix} Tc_1 \\ \vdots \\ Tc_N \end{bmatrix}$$

than the system can be rewritten in compact form as $$Ax=b.$$

As mentioned above, it is assumed that L the number of routes is far bigger than the number of unknown turn cost variables, i.e. L>>N and as such there is no exact solution.

The linear system presented above may be solved in the Least Square Sense $x^+=A^+b$, where the $A^+$ is the Moore-Penrose pseudo-inverse. The turn cost vector $x^+$ will provide the optimal turn cost values to be used by the routing in combination with a given map.

The Moore-Penrose pseudo-inverse will helps to calculate a set of values for the unknown turn costs that will gives the minimum of the second norm of the error vector, which means that $$\min_x(\|Ax - b\|_2) = \|Ax^+ - b\|_2 = \sqrt{(Ax^+ - b)^T(Ax^+ - b)}.$$

This means that it is not possible to calculate a set of turn costs that will produce the exact estimated time for the calculated routes but the we will have an optimal set of values that will minimize the global estimation error. Thus, a mathematical method has been used to derive an approximate solution to the set of linear equations (step 1102)

The pseudo-inverse approach is a least square method because we minimize the second norm of the error.

Thus, this second method determines an average turn costs for the turns in any one category; eg in the embodiment being descried for intersections having a predetermined angular relationship.

Finally in steps 1010 and 1104 further map data is created in which the transit time for any intersections that have had that property calculated is associated with that intersection. Such association may be explicitly (eg providing a transit time or set of transit times in a look-up table, as part of the map data, etc.) or by defining a methodology from which the transit time or set of transit times may be deduced (eg. by providing an offset to a base time which allows the transit time to be calculated).

The skilled person will appreciate that, whilst the term GPS data has been used to refer to positioning data derived from a GPS global positioning system as for example described in relation to FIG. 1. Other positioning data could be processed in a manner similar to the methods as described herein. Thus, term GPS data may be replaceable with the phrase positioning data. Such positioning data, could for example be derived from position data derived from mobile phone operation, data received at toll barriers, data obtained from induction loops embedded in roads, data obtained from number plate recognition system, data obtained from car-to-car communication, data obtained from on-board sensors (e.g., a laser scanner)

observing surrounding mobile and stationary objects and supporting relative positioning, or any other suitable data.

It will also be well understood by persons of ordinary skill in the art that whilst the embodiment described herein implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A computerised method of creating data for a map from position data derived from the positions of a plurality of vehicles over a period of time, the map comprising a plurality of navigable segments representing segments of a navigable route in the area covered by the map and the map also comprising intersections between navigable segments representing intersections in the navigable route, each intersection having at least one maneuver associated therewith, the method comprising using a processing circuitry to perform the following:
    determining, for each of a plurality of intersections, position data corresponding to a portion of a vehicle trip that passed through an intersection, said determination comprising determining whether vehicle positions within the position data are at least within a predetermined distance of the intersection;
    clustering the determined position data according to the maneuver made by the vehicle when it passed through the intersection;
    classifying each maneuver at the plurality of intersections into a sector category based on an angle difference between the incoming and outgoing navigable segments representing the maneuver, each sector category representing a range of angles; and
    calculating, from the clustered position data, a transit time profile for each sector category, the transit time profile comprising a plurality of transit times, each transit time being indicative of an average time to perform a maneuver at an intersection within the sector category in a predetermined time period; and
    generating further data for the map, which for at least some of the intersections therein, contains the transit time profile associated with the intersection for which the calculation was made.

2. The method according to claim 1 in which each maneuver at the plurality of intersections is further classified into a category based on at least one of:
    a class, type or importance of the incoming and outgoing navigable segments representing the maneuver; and
    a difference in driving speeds between the outgoing and incoming navigable segments representing the maneuver, and
    wherein a set of transit times is calculated for each category, each transit time for a category being indicative of an average time to perform a maneuver at an intersection within the category in a predetermined time period.

3. The method according to claim 1 in which the determination of the corresponding to a portion of a vehicle trip that passed through an intersection further comprises determining whether a vehicle generating the position data is within
    a predefined class of vehicle categories.

4. The method according to claim 1 in which the predetermined time period comprises discrete time slots associated with a given day or week.

5. The method according to claim 1, further comprising using the processing circuitry to use a transit time from the generated further data containing the transit time profile to plan and display a route.

6. The method according to claim 1, wherein each transit time is expressed as a transit time offset in relation to a reference transit time.

7. A machine arranged to create data for a map, the map comprising a plurality of navigable segments, representing segments of a navigable route in the area covered by the map and intersections between navigable segments representing intersections in the navigable route, each intersection having at least one maneuver associated therewith, the machine comprising processing circuitry arranged to process position data derived from the positions of a plurality of vehicles over a period of time, the processing circuitry being programmed to:
    determine, for each of a plurality of intersections, position data corresponding to a portion of a vehicle trip that passed through an intersection, said determination comprising determining whether vehicle positions within the position data are at least within a predetermined distance of the intersection;
    cluster the determined position data according to the maneuver made by the vehicle when it passed through the intersection;
    classify each maneuver at the plurality of intersections into a sector category based on an angle difference between the incoming and outgoing navigable segments representing the maneuver, each sector category representing a range of angles; and
    calculate, from the clustered position data, a transit time profile for each sector category, the transit time profile comprising a plurality of transit times, each transit time being indicative of an average time to perform a maneuver at an intersection within the sector category in a predetermined time period; and
    generate further data for the map, which for at least some of the intersections therein, contains the transit time profile associated with the intersection for which the calculation was made.

8. The machine according to claim 7 in which the predetermined time period comprises discrete time slots associated with a given day or week.

9. The machine according to claim 7, wherein the processing circuitry is further programmed to use a transit time from the generated further data containing the transit time profile to plan and display a route.

10. The machine according to claim 7, wherein each transit time is expressed as a transit time offset in relation to a reference transit time.

11. A non-transitory machine readable medium containing instructions which when read by a machine cause that machine to perform the method of claim 1.

12. A non-transitory machine readable medium containing instructions which when read by a machine cause that machine to perform as the machine of claim 10.

* * * * *